United States Patent

Boucourt et al.

[15] 3,697,556
[45] Oct. 10, 1972

[54] PREPARATION OF 7α-METHYL STEROIDS

[72] Inventors: Robert Boucourt; Lucien Nedelec, both of Clichy-sous-Bois; Jean-Claude Gasc, Bondy, all of France

[73] Assignee: Roussel UCLAF, Paris, France

[22] Filed: July 27, 1970

[21] Appl. No.: 58,668

[30]     Foreign Application Priority Data

July 28, 1969     France.....................6925702

[52] U.S. Cl. ...........260/397.45, 260/397.5, 260/999
[51] Int. Cl.............................................C07c 169/22
[58] Field of Search ......./Machine Searched Steroids

[56]            References Cited

UNITED STATES PATENTS 3,341,557   9/1967   Babcock et al.........260/397.3

*Primary Examiner*—Henry A. French
*Attorney*—Hammond & Littell

[57]            ABSTRACT

A novel process for the preparation of 7α-methyl-Δ$^{4,9}$-gonadienes of the formula

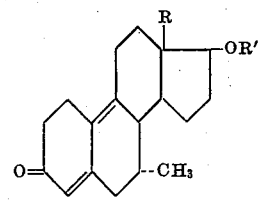

wherein R is alkyl of one to four carbon atoms and R' is selected from the group consisting of hydrogen, acyl of an organic carboxylic acid of one to 18 carbon atoms and an organic ether radical, a novel process for preparing the corresponding Δ$^{4,9,11}$-gonatrienes and novel intermediates produced by the said processes.

6 Claims, No Drawings

PREPARATION OF 7α-METHYL STEROIDS

OBJECTS OF THE INVENTION

It is an object of the invention to provide a novel process for the preparation of Δ$^{4,9}$-gonadienes of formula I.

It is another object of the invention to provide a novel process for the preparation of the corresponding Δ$^{4,9,11}$-gonatrienes.

It is a further object of the invention to provide novel intermediates produced in said processes.

These and other objects and advantages of the invention will become obvious from the following detailed description.

THE INVENTION

The novel process of the invention for the preparation of 7α-methyl-Δ$^{4,9}$-gonadienes of the formula

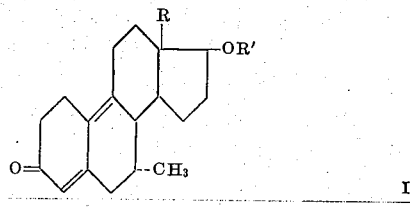

wherein R is alkyl of one to four carbon atoms and R' is selected from the group consisting of hydrogen, acyl of an organic carboxylic acid of one to 18 carbon atoms and an organic ether radical comprises reacting a 13β-R-Δ$^4$-gonene of the formula

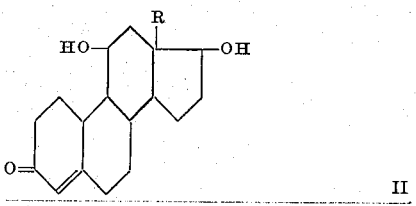

with an acylating agent or a mixture of acylating agents of an organic carboxylic acid of one to 10 carbon atoms to obtain a Δ$^{3,5}$-gonadiene of the formula

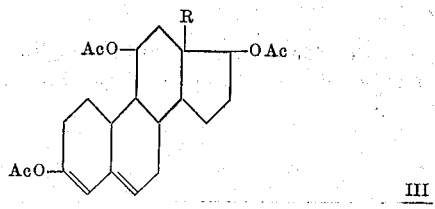

wherein Ac is acyl of an organic carboxylic acid of one to 10 carbon atoms, selectively brominating the latter in the 6-position with a brominating agent to obtain a compound of the formula

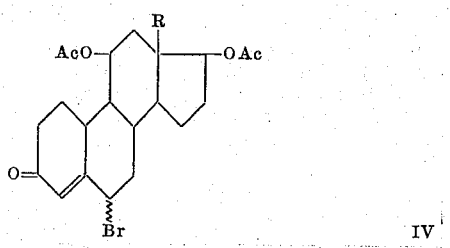

dehydrobrominating the latter with a lithium halide in the presence of a basic agent to obtain a Δ$^{4,6}$-gonadiene of the formula

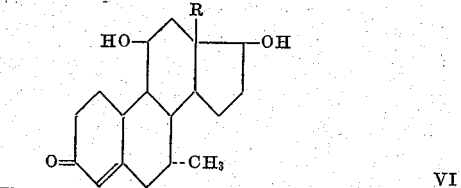

reacting the latter with an organometallic agent containing a methyl group and saponifying the incompletely cleaved esters with a base to obtain a compound of the formula

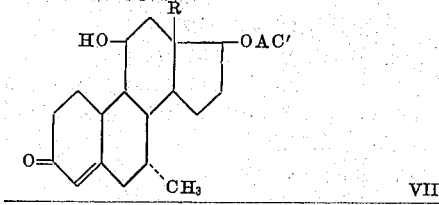

reacting the latter with an esterifying agent to form the compound of the formula wherein Ac' is acyl of an organic carboxylic acid of one to 18 carbon atoms, treating the latter with a dehydrating agent to obtain a mixture of dehydrated products and treating the said mixture with a strong acid in a protic media to obtain a compound of formula I wherein R' is acyl of an organic carboxylic acid of one to 18 carbon atoms which may be saponified to obtain the corresponding compound of formula I wherein R' is hydrogen. The said product can then be reacted with an etherification agent or esterification agent, if desired.

In the compounds of formula I, R is preferably methyl, ethyl, propyl or butyl.

Examples of suitable organic acids of one to 18 carbon atoms may be derived from an aliphatic, aromatic, cycloaliphatic or heterocyclic carboxylic acid. Examples of suitable acids are alkanoic acids, such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelargonic acid, capric acid, undecylic acid, lauric acid, myristic acid, palmitic acid and stearic acid; alkenoic acids, such as undecylenic acid and oleic acid, cycloalkyl carboxylic acids, such as cyclopentyl carboxylic acid, cyclopropyl carboxylic acid, cyclobutyl carboxylic acid and cyclohexyl carboxylic acid; cycloalkyl alkanoic acids, such as cyclopentyl acetic acid, cyclohexyl acetic acid, cyclopentyl propionic acid and cyclohexyl propionic acid; arylalkanoic acids, such as phenyl acetic acid and phenyl propionic acid; aryl carboxylic acids, such as benzoic acid and 2,4-dinitrobenzoic acid; phenoxy alkanoic acids, such as phenoxy acetic acid, p-chlorphenoxy acetic acid, 2,4-dichlorophenoxy acetic acid, 4-ter-butylphenoxy acetic acid, 3-phenoxy propionic acid and 4-phenoxy butyric acid; heterocyclic carboxylic acids, such as furane-2-carboxylic acid, 5-terbutylfurane-2-carboxylic acid, 5-bromo-furane-2-carboxylic acid and nicotinic acids; β-ketoalkanoic acids, such as acetylacetic acid, propionylacetic acid and butyrylacetic acid; amino acids, such as diethylaminoacetic acid and aspartic acid.

The ethers of R' are preferably aliphatic such as lower alkyl, i. e. methyl, ethyl, propyl, butyl ; alkenyl such as allyl, aryl such as benzyl or heterocyclic such as tetrahydropyranyl.

Examples of preferred compounds of formula I are 7α-methyl-13β-ethyl-17β-allyloxy-$\Delta^{4,9}$-gonadiene-3-one, 7α-methyl-13β-ethyl-$\Delta^{4,9}$-gonadiene-17β-ol-3-one, 7α-methyl-13β-ethyl-17β-undecanoyloxy-$\Delta^{4,9}$-gonadiene-3-one, 7α-methyl-13β-ethyl-17β-tetrahydropyranyloxy-$\Delta^{4,9}$-gonadiene-3-one, 7α-methyl-13β-ethyl-17β-propoxy-$\Delta^{4,9}$-gonadiene-3-one, 7α-methyl-13β-ethyl-17β-phenylacetoxy-$\Delta^{4,9}$-gonadiene-3-one, 7α-methyl-13β-ethyl-17β-propionyloxy-$\Delta^{4,9}$-gonadiene-3-one, 7α-methyl-13β-ethyl-17β-benzyloxy-$\Delta^{4,9}$-gonadiene-3-one, 7α-methyl-13β-propyl-$\Delta^{4,9}$-gonadiene-17β-ol3-one, 7α-methyl-13β-propyl-17β-acetoxy-$\Delta^{4,9}$-gonadiene-3-one and 7α-methyl-13β-propyl-17β-benzoyloxy-$\Delta^{4,9}$-gonadiene-3-one.

The acylation of the compound of formula II in the 3, 11 and 17 positions with enolization of the 3-keto group is preferably effected with a mixture of the corresponding acid anhydride and acid chloride in the presence of a tertiary base such as a mixture of acetic acid anhydride and acetyl chloride in a pyridine media.

The selective bromination in the 6-position is preferably effected with N-bromosuccinimide in a mixture of dimethyl formamide and water but other classical brominating methods may be used such as bromine in a mixture of acetic acid and collidine.

The lithium halide used for the dehydrohalogenation is preferably lithium bromide and the basic agent is preferably lithium carbonate and the said step is preferably effected in dimethylformamide. Advantageously, the process is effected without separation of the bromo derivative and the yields are higher for this process than when the bromo derivative is isolated.

The organo metallic derivative is preferably a methyl magnesium halide such as methyl magnesium bromide and the operation is effected advantageously in the presence of a catalyst such as cuprous iodide, bromide or chloride or cuprous acetate. After treatment with the organo magnesium derivative and isolation, the ester functions of the steroids in the 11– and 17–positions are incompletely cleaved and the completion of the saponification of the ester groups is effected with a base such as potassium hydroxide in an organic solvent such as methanol.

The selective acylation in the 17–position can be effected by known methods, for example, with acetic acid in the presence of perchloric acid. The dehydration agent is preferably N-bromoacetamide in the presence of sulfur dioxide although phosphorus oxychloride or thionyl chloride in the presence of pyridine may be used.

The mixture of raw products resulting from the dehydration step contains 7α-methyl-13β-R-17β-acyloxy-$\Delta^{4,9}$-gonadiene-3-one and other dienic compounds characterized by their infrared and ultraviolet spectra and the double bonds are either conjugated [5(10)9(11)] or non-conjugated [4,9 or 4,11].

The strong acid for the treatment of the dehydration product is preferably selected from the group consisting of perchloric acid, sulfuric acid, p-toluene sulfonic acid and a cationic sulfonic acid exchange resin and the protic media is acetic acid or a lower aliphatic alcohol. This treatment leads mainly to a mixture of 7α-methyl-13β-R-17β-acyloxy-$\Delta^{4,11}$-gonadiene-3-one and 7α-methyl-13β-R-17β-acyloxy-$\Delta^{4,9}$-gonadiene-3-one which can be separated by chromatography.

The saponification of the latter compound may be effected by potassium hydroxide in a methanolic media, for example, to form 7α-methyl-13β-R-$\Delta^{4,9}$-gonadiene-17β-ol-3-one which can be esterified or etherified by classical methods. The esterification of 17-hydroxy could be effected with a convenient acid functional derivative such as the acid anhydride or acid chloride in the presence of a tertiary amine. The etherification can be effected with a hydrocarbonhalide with an alkali metal derivative of the 17 hydroxyl preferably with the 3-keto protected by a ketal.

The process of the invention results in the preparation of novel intermediates of the formula

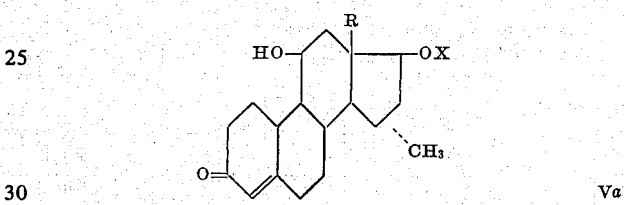

Va wherein R is alkyl of one to four carbon atoms and X is hydrogen or acyl of an organic carboxylic acid of one to 18 carbon atoms. The said intermediates are of industrial interest as they give easy access to the $\Delta^{4,9}$-gonadienes of formula I as well as the corresponding $\Delta^{4,9,11}$-gonatrienes.

The intermediates of formula Va can be transformed by the process of copending, commonly assigned application Ser. No. 58,730 filed on even date herewith with the action of a dehydration agent into the corresponding 7α-methyl-13β-R-17β-OX-$\Delta^{4,11}$-gonadiene-3-one which have very interesting anabolic and androgenic properties. Using the process of copending, commonly assigned application Ser. No. 58,666 filed on even date herewith, the intermediates of formula Va can be transformed into the corresponding 7α-methyl-13β-R-17α-$Z_1$-17β-$OZ_2$-$\Delta^{4,9,11}$-gonatriene-3-one wherein $Z_1$ is aliphatic hydrocarbon and $Z_2$ is hydrogen or acyl of an organic carboxylic acid which compounds have marked anabolic and androgenic properties.

Examples of compounds of formula Va are:
7α-methyl-13β-ethyl-$\Delta^4$-gonene-11β,17β-diol-3-one, 7α-methyl-13β-ethyl-17β-acetoxy-$\Delta^4$-gonene-11β-ol-3-one, 7α-methyl-13β-ethyl-17β-phenylacetoxy-$\Delta^4$-gonene-11β-ol-3-one, 7α-methyl-13β-ethyl-17β-propionyloxy-$\Delta^4$-gonene-11β-ol-3-one, 7α-methyl-13β-propyl-$\Delta^4$-gonene-11β,17β-diol-3-one, 7α-methyl-13β-propyl-17β-acetoxy-$\Delta^4$-gonene-11β-ol-3-one and 7α-methyl-13β-propyl-17β-benzoyloxy-$\Delta^4$-gonene-11β-ol-3-one.

In a variation of the process, one can produce 7α-methyl-$\Delta^{4,9,11}$-gonatrienes of the formula

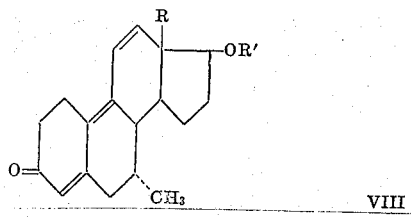

VIII wherein R and R' have the above definitions by reacting 7α-methyl-13β-R-17β-acyloxy-Δ⁴-gonene-11β-ol-3-one of formula VII with a dehydrating agent to form a mixture of dehydration products, reacting the latter with oxygen in the presence of a tertiary amine to obtain a hydroperoxide product, reacting the latter with a reducing agent to obtain the corresponding 7α-methyl-13β-R-17β-acyloxy-Δ⁴,⁹-gonadiene-11β-3-one, reacting the latter with a strong acid in the presence of a nucleophilic agent in an aprotic solvent to form 7α-methyl-13β-R-17β-acyloxy-Δ⁴,⁹,¹¹-gonatriene-3-one which may be saponified to obtain the corresponding 17β-ol compound which may be esterified or etherified by the usual methods.

The raw product resulting from the reaction with the dehydration agent is a mixture of diverse dienic compounds whose double bonds may be conjugated or non-conjugated.

The dehydration agent is preferably N-bromo acetamide in the presence of sulfur dioxide but phosphorus oxychloride or thionyl chloride in the presence of pyridine can also be used. The oxydation of the dehydration product is preferably effected in the presence of a tertiary amine such as pyridine or triethylamine in an organic solvent, such as alcohols, i.e., methanol or ethanol or dialkylamide such as dimethyl formamide.

The reduction of the hydroperoxide is preferably effected with trimethyl or triethyl phosphite and is effected in an organic solvent such as ethanol or other alcohols or with an alkali metal iodide such as potassium iodide.

The reduction of the hydroperoxide gives a mixture of 7α-methyl-13β-R-17βacyloxy-Δ⁴,¹¹-gonadiene-3-one and 7α-methyl-13β-R-17β-acyloxy-Δ⁴,⁹-gonadiene-11β-ol-3-one which can be separated by chromatography. The latter compound is treated with a mineral acid such as sulfuric acid or perchloric acid or an organic acid such as formic acid or p-toluene sulfonic acid or a Lewis acid such a boron trifluoride to obtain the corresponding 7α-methyl-13β-R-17β-acyloxy-Δ⁴,⁹,¹¹-gonatriene-3-one. The nucleophile agent is preferably an organic acid nitrile such as acetonitrile, malonic dinitrile or dichloroacetonitrile, etc., or an alkali metal cyanide such as potassium or sodium cyanide, and the aprotic solvent may be methylene chloride, chloroform, cyclohexane, benzene, ether or tetrahydrofuran.

The saponification of the 17β-acyloxy group of the latter compound may be effected with potassium hydroxide in a methanolic media. The esterification or etherification may then be effected in known methods.

The 13β-R-Δ⁴-gonenes of formula II useful as the starting materials in the process of the invention are described in French Pat. No. 1,574,693.

The 7α-methyl-13β-R-Δ⁴,⁹-gonadiene-17β-ol-3-ones of formula I and the 7α-methyl-13β-R-Δ⁴,⁹,¹¹-gonatriene-17β-ol-3-ones of formula VIII possess anabolic and androgenic properties making themuseful for treatment of protidic anabolic troubles, of asthenia, thinness, osteoporosis, andropause, aging, retarding of consolidation of fractures, metabolic troubles from prolonged corticotherapy, adiposogenital syndrome, functional menometrorrhagia, fibromas, endometriosis, and as a healing agent for the treatment of various ulcers.

In the following examples, there are described several preferred embodiments to illustrate the invention. However, it should be understood that the invention is not intended to be limited to the specific embodiments.

EXAMPLE I

PREPARATION OF 7α-methyl-13β-ethyl-17β-acetoxy-Δ⁴,⁹-gonadiene-3-one

Step A: 3,11β,17β-triacetoxy-13β-ethyl-Δ³,⁵-gonadiene 25 gm of 13β-ethyl-Δ⁴-gonene-11β,17β-diol-3-one (described in French Pat. No. 1,574,693) were added under a nitrogen atmosphere to a mixture of 250 cc of acetic acid anhydride, 8.75 cc of acetyl chloride and 8.75 cc of pyridine and the mixture was refluxed for 5½ hours. After cooling, the mixture was concentrated to dryness under reduced pressure and the residue was dissolved in 150 cc of a boiling mixture of acetic acid and methanol (8–2). The solution was treated with carbon black, filtered hot and the filtrate was concentrated to 100 cc. After cooling, crystal-lization was started and the mixture was filtered to obtain 25.5 gm of 3,11β,17β -tri acetoxy-13β-ethyl-Δ³,⁵-gonadiene melting at 181° C. Concentration of the mother liquors and crystallization from a mixture of acetic acid-methanol gave a second crop of 4.4 gm of the said product melting at 180° C.

U. V. Spectrum (ethanol):
Max. at 234–235 mu   $\epsilon = 17,950$
IR Spectrum (CCl₄):
Absorption at 1757 $cm^{-1}$ and 1208 $cm^{-1}$ (enolic acetate); at 1738 and 1239 $cm^{-1}$ (acetate in 11 and 17); at 1668 and 1635 $cm^{-1}$ (double bond).

As far as is known, this compound is not described in the literature.

Step B: 6 ζ-bromo-11β,17β-diacetoxy-13β-ethyl-Δ⁴-gonene-3-one 133.4 gm of 3,11β,17β-triacetoxy-13β-ethyl-Δ⁴-gonene were added under a nitrogen atmosphere to a mixture of 450 cc of dimethylformamide and 7 cc of distilled water and after cooling to 0°C, 62 gm of N-bromosuccinimide were added over an hour thereto to obtain a positive amido-iodide paper test to obtain a solution of 6ξ-bromo-11β,17β-diacetoxy-13β-ethyl-Δ⁴-gonene-3-one which was used without isolation for the next step. The compound could be isolated, if desired, by concentration of the reaction mixture, dilution with water, extraction with an organic solvent and concentration to dryness.

As far as is known, this compound is not described in the literature.

Step C: 11β,17β-diacetoxy-13β-ethyl-Δ⁴,⁶-gonadiene-3-one 33.2 gm of lithium bromide and 66.4 gm of lithium carbonate were added to the solution of Step B and the reaction mixture was heated for 17 hours at 95° C with agitation. After cooling, the reaction mixture was made acidic with acetic acid and was stirred. The precipitate formed was recovered by vacuum filtration and was dried to obtain 120 gm of raw 11β,17β-diacetoxy-13β-ethyl-Δ$^{4,6}$-gonadiene-3-one which was amorphous which was used as is for the next step. Crystallization from isopropyl ether gave a product melting at 123°–124° C.

U.V. Spectrum (ethanol):

Max. at 281–282 μ    ε = 23,000

I. R. Spectrum (CCl$_4$):

Absorptions at 1659 cm$^{-1}$ (conjugated ketone); at 1619 and 1585 cm$^{-1}$ (double bond) and at 1725 cm$^{-1}$ (non-enolic acetate).

As far as is known, this compound is not described in the literature.

STEP D: 7α-methyl-13β-ethyl-Δ$^4$-gonene-11β, 17β-diol-3-one 2.8 gm of powdered cuprous chloride in 545 cc of a 0.92 M solution of methyl magnesium bromide were stirred for 15 minutes at room temperature, the mixture was cooled to −10°C. Then a solution of 44 gm of 11β, 17β-diacetoxy-13β-ethyl-Δ$^{4,6}$gonadiene-3-one in 290 cc of tetrahydrofuran was progressively added and then the temperature was allowed to return to 20°C. After stirring for 20 minutes, the reaction mixture was added to a water-hydrochloric acid mixture and the aqueous phase was then extracted with methylene chloride. The methylene chloride extracts were washed with water, were dried and concentrated to dryness. The residue was dissolved under a nitrogen atmosphere in a mixture of 450 cc of methanol and 45 cc of a 48° Be aqueous potassium hydroxide solution and the mixture was refluxed for 1 hour and then cooled. The mixture was added to water and was then acidified to a pH of 3.5 with aqueous hydrochloric acid. The aqueous phase was extracted with methylene chloride and the methylene chloride extract was washed with water, dried and concentrated to dryness. The residue was dissolved in methylene chloride and the resulting solution was passed through an activated magnesium silicate column, was concentrated to dryness and the residue was crystallized from a mixture of methanol and isopropyl ether to obtain 13.9 gm of raw 7α-methyl-13β-ethyl-Δ$^4$-gonene-11β,17β-diol-3-one melting at 246°C which was used as is for the next step. The melting point of the purified product after crystallization from methanol was 248°C.

UV Spectrum (ethanol):

Max. at 244 mμ    ε = 16,700

RMN Spectrum (deuterochloroform):

Peaks at 42–48.5 hz (hydrogens at 7-methyl); at 61.5–69 hz (hydrogens at 13-ethyl); at 225 hz (hydrogen at 17α); at 252 hz (11α-hydrogen); and at 352.5 hz (4-hydrogen).

As far as is known, this compound is not described in the literature.

STEP E: 7α-methyl-13β-ethyl-17β-acetoxy-Δ$^4$-gonene-11β-ol-3-one 23.5 gm of 7α-methyl-13β-ethyl-Δ$^4$-gonene-11β,17β-diol-3-one melting at 246° C were added to a mixture of 590 cc of acetic acid and 23.5 cc of an aqueous 53° Be' perchloric acid solution under a nitrogen atmosphere and the reaction mixture was stirred for 5 hours at room temperature. The mixture was then poured into a water-ice mixture and the aqueous phase was extracted with methylene chloride. The methylene chloride extracts were washed successively with water, a saturated aqueous sodium bicarbonate solution, and then water, were dried and concentrated to dryness. The residue was purified by chromatography over silica with elution with an 8-2 mixture of chloroform-acetone and crystallization from isopropyl ether to obtain 19.4 gm of 7α-methyl-13β-ethyl-17β-acetoxy-Δ$^4$-gonene-11β-ol-3-one melting at 186° C.

UV Spectrum (ethanol):

max. at 243 mμ    ε = 16,900

IR Spectrum (CCl$_4$):

Absorptions at 1658 cm$^{-1}$ (ketone); at 1610 cm$^{-1}$ (double bond); at 1712 cm$^{-1}$ (acetoxy); at 3600 cm$^{-1}$ (hydroxyl).

As far as is known, this compound is not described in the literature.

STEP F: 7α-methyl-13β-ethyl-17β-acetoxy-Δ$^{4,9}$-gonadiene-3-one 23 gm of 7β-methyl-13β-ethyl-17β-acetoxy-Δ$^4$-gonene-11β-ol-3-one were added under a nitrogen atmosphere to 287 cc of pyridine and after the addition of 13.1 gm of N-bromo acetamide to the reaction mixture, it was stirred for 15 minutes at room temperature. After cooling to 0° C, sulfur dioxide was bubbled through the reaction mixture until an amido-iodide paper test was negative and the reaction mixture was then poured into a water-ice mixture. The aqueous phase was extracted with methylene chloride and the organic phase was washed with an aqueous hydrochloric acid solution and then water, was dried and concentrated to dryness to obtain 21.5 gm of a mixture of raw dehydrated products.

The 21.5 gm of raw dehydrated products were dissolved under a nitrogen atmosphere in a mixture of 215 cc of acetic acid and 21.5 cc of a 65 percent aqueous solution of perchloric acid and the reaction mixture was stirred for 40 minutes at room temperature. The reaction mixture was poured into a mixture of a saturated aqueous sodium bicarbonate solution and ethyl ether and after stirring, the organic phase was decanted off. The aqueous phase was extracted with ether and the ether extracts were washed with water, dried and concentrated to dryness. The residue was purified by chromatography over silica gel and elution with a 3–1 mixture of ethyl ether and petroleum ether (Bp = 35°–70°C) to obtain 8.85 gm of a fraction rich in the desired product. The 8.85 gm was purified by dissolution in methylene chloride and passing the solution through an alumina column. The methylene chloride solution was concentrated to dryness and the residue was empasted with a hot mixture of petroleum ether (Bp = 35°–70° C) and isopropyl ether (9–1) to obtain 4.3 gm of raw product melting at 110° C. Crystallization from a mixture of isopropyl ether and petroleum ether (Bp = 35–70° C) gave 3.18 gm of 7α-methyl-13β-ethyl-17β-acetoxy-Δ$^{4,9}$-gonadiene-3-one melting at 112°C and having a specific rotation $[α]_D^{20}$ = −271° (c = 0.43% in chloroform).

UV Spectrum (ethanol):

Max. at 217 m μ    ε = 5800

Inflex. towards 230 mμ    ε = 5500

Max. at 306 mμ    ε = 18 700

RMN Spectrum (deuterochloroform):

Peaks at 43–50 hz (hydrogens of 7-methyl); at 53–60–67 hz (hydrogens of 13-ethyl); at 123 hz (methyl hydrogens of 17-acetoxy); at 283 hz (17α-hydrogen); and at 341 hz (4-hydrogen).

This compound is identical to 7α-methyl-13β-ethyl-17β-acetoxy-Δ$^{4,9}$-gonadiene-3-one described in Belgian Pat. No. 690,368.

EXAMPLE II

PREPARATION OF 7α-methyl-13β-ethyl-17β-acetoxy-Δ$^{4,9,11}$-gonatriene-3-one Step A: 25.6 gm of 7α-methyl-13β-ethyl-17β-acetoxy-Δ$^4$-gonene-11β-ol-3-one were dehydrated by the procedure of Step F of Example I to obtain 21.6 gm of a mixture of raw dehydrated products. The entire mixture of raw dehydrated product was dissolved in 540 cc of ethanol containing 1 percent of triethylamine and a current of oxygen was bubbled through the solution for 6 hours. The reaction mixture was concentrated to dryness under reduced pressure.

The dried residue was dissolved under a nitrogen atmosphere in 192 cc of ethanol and 17.4 cc of triethyl phosphite were added to the reaction mixture which was then refluxed for 2 hours. After cooling, excess reducing agent was destroyed by the addition of oxygenated water until a positive amido-iodide paper test was achieved. The mixture was diluted with water and extracted with methylene chloride. The methylene chloride extracts were concentrated to dryness and the residue was purified by chromatography over silica gel with elution with a 3–1 mixture of ethyl ether-petroleum ether (Bp = 35° – 70°C) to obtain 11.2 gm of 7α-methyl-13β-ethyl-17β-acetoxy-Δ$^{4,9}$-gonadiene-11β-ol-3-one melting at 155°C (not distinct).

IR Spectrum (CCl$_4$):
Absorptions at 1600 cm$^{-1}$ (double bond); at 1658 cm$^{-1}$ (ketone); at 1710 cm$^{-1}$ (carbonyl of acetate); and at 3540 cm$^{-1}$ (hydroxyl).

UV Spectrum (ethanol):
max. at 214–215 mμ    ε = 3,700
max. at 236 mμ    ε = 3,500
max. at 299 mμ    ε = 13,200
The raw product was used as is for the next step.
As far as is known, this compound is not described in the literature.

Step B: 2.75 gm of raw 7α-methyl-13β-ethyl-17β-acetoxy-Δ$^{4,9}$-gonadiene-11β-ol-3-one were added under a nitrogen atmosphere to a mixture of 55 cc of pure methylene chloride (except for methanol), 11.15 cc of acetonitrile and 2.23 cc of an aqueous 65 percent of perchloric acid and after stirring the mixture for 2 minutes at room temperature, it was poured rapidly into a water-ice mixture. The aqueous phase was extracted with methylene chloride and the organic extracts were washed with water, dried and concentrated to dryness. The residue was purified by chromatography over silica gel and elution with a 3–1 mixture of ethyl ether - petroleum ether (Bp = 35°–70°C) to obtain 1.4 gm of 7α-methyl-13β-ethyl-17β-acetoxy-Δ$^{4,9,11}$-gonatriene-3-one melting at 153°C. The product after crystallization from isopropyl ether had a melting point of 154°C and specific rotations [α]$_D$ = + 3° (c = 0.75 percent in ethanol) and −19.5° (c = 0.75 percent in chloroform).

U.V. Spectrum (ethanol):
max. at 237–238 mμ    ε = 6,100
Inflex. towards 271 mμ    ε = 3,700
Max. at 340–341 mμ    ε = 29,800

RMN Spectrum (deuterochloroform)
Peaks at 42.5 – 49.5 hz (hydrogens of 7-methyl); at 51–58–65 hz (hydrogens of 13-ethyl) ; at 125.5 hz (hydrogens of methyl of 17-acetoxy); at 286–293–302 hz (17α-hydrogen); at 347 hz (4-hydrogen); and at 377–387—400 hz (hydrogens in 11– and 12–position).

As far as is known, this compound is not described in the literature.

Various modifications of the products and process of the invention may be made without departing from the spirit or scope thereof and it is to be understood that the invention is to be limited only as defined in the appended claims.

We claim:

1. A process for the preparation of 7α-methyl-Δ$^{4,9}$-gonadienes of the formula

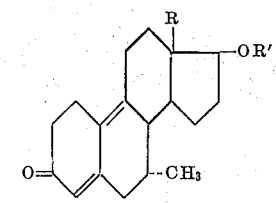

wherein R is alkyl of one to four carbon atoms and R' is selected from the group consisting of hydrogen, acyl of an organic carboxylic acid of one to 18 carbon atoms and an organic radical selected from the group consisting of lower alkyl, lower alkenyl, benzyl and tetrahydropyranyl comprising reacting a 13βΔ$^4$-gonene of the formula

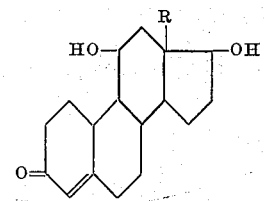

with an acylating agent of an organic carboxylic acid of 1 to 10 carbon atoms to obtain a Δ$^{3,5}$-gonadiene of the formula

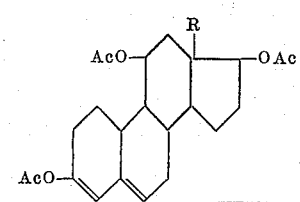

wherein Ac is acyl of an organic carboxylic acid of one to 10 carbon atoms, selectively brominating the latter in the 6-position with a brominating agent selected from the group consisting of bromine and N-bromosuccinimide to obtain a compound of the formula

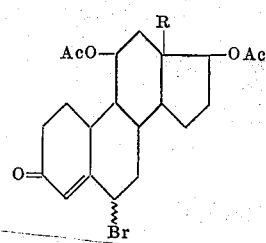

dehydrobrominating the latter with a lithium halide in the presence of a basic agent to obtain a $\Delta^{4,6}$-gonadiene of the formula

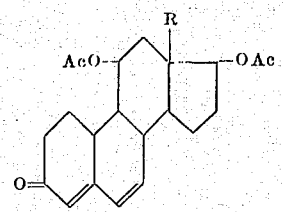

reacting the latter with an organometallic agent containing a methyl group and saponifying the incompletely cleaved esters with a base to obtain a compound of the formula

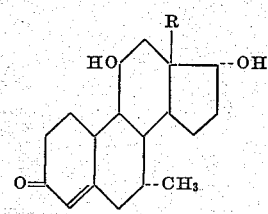

reacting the latter with an esterifying agent to form the compound of the formula

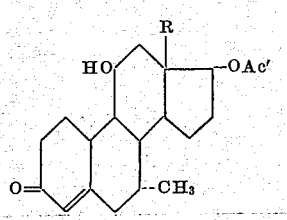

wherein Ac' is acyl of an organic carboxylic acid of one to 18 carbon atoms, treating the latter with a dehydrating agent selected from the group consisting of thionylchloride, N-bromoacetamide and phosphorus oxychloride and treating the resulting product with a strong acid in a protic media to obtain the desired 7α-methyl-$\Delta^{4,9}$-gonadiene.

2. A process for the preparation of 7α-methyl-$\Delta^{4,9,11}$-gonatriene-17β-ol of the formula

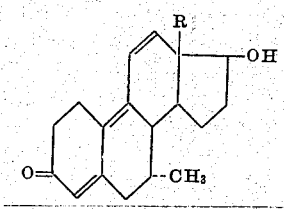

wherein R is alkyl of one to four carbon atoms comprising reacting 7α-methyl-13β-R-17β-acyloxy-$\Delta^4$-gonene-11β-ol-3-one of the formula

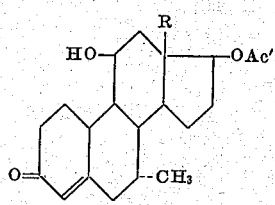

wherein Ac' is acyl of an organic carboxylic acid of one to 18 carbon atoms, with a dehydrating agent selected from the group consisting of thionylchloride, N-bromoacetamide and phosphorus oxychloride to form a mixture of dehydration products, reacting the latter with oxygen in the presence of a tertiary amine to obtain a hydroperoxide product, reacting the latter with a reducing agent to obtain the corresponding 7β-methyl-13β-R-17β-acyloxy-$\Delta^{4,9}$-gonadiene-11β-ol-3-one, reacting the latter with a strong acid in the presence of a nucleophilic agent in an aprotic solvent to form 7α-methyl-13β-R-17β-acyloxy-$\Delta^{4,9,11}$-gonatriene-3-one and saponifying the latter to obtain the corresponding 7α-methyl-$\Delta^{4,9,11}$-gonatriene-17β-ol.

3. 3,11β,17β-triacetoxy-13β-ethyl-$\Delta^{3,5}$-gonadiene.

4. 6ξ-bromo-11β,17β-diacetoxy-13β-ethyl-$\Delta^4$-gonene-3-one.

5. 7α-methyl-13β-ethyl-17β-acetoxy-$\Delta^{4,9}$-gonadiene-11β-ol-3-one.

6. 7α-methyl-13β-ethyl-17β-acetoxy-$\Delta^{4,9,11}$-gonatriene-3-one.

* * * * *